United States Patent
McAfee et al.

(10) Patent No.: US 7,104,366 B2
(45) Date of Patent: Sep. 12, 2006

(54) METHOD OF INCREASING FRICTION MATERIAL UTILIZATION FOR CARBON BRAKES

(75) Inventors: David D. McAfee, Niles, MI (US); Slawomir T. Fryska, Granger, IN (US)

(73) Assignee: Honeywell International, Morristown, NJ (US)

( * ) Notice: Subject to any disclaimer, the term of this patent is extended or adjusted under 35 U.S.C. 154(b) by 386 days.

(21) Appl. No.: 10/316,636

(22) Filed: Dec. 11, 2002

(65) Prior Publication Data

US 2004/0112687 A1 Jun. 17, 2004

(51) Int. Cl.
*F16D 55/36* (2006.01)
(52) U.S. Cl. .................... 188/71.5; 188/71.7
(58) Field of Classification Search ............. 188/71.5, 188/71.7
See application file for complete search history.

(56) References Cited

U.S. PATENT DOCUMENTS

| | | | |
|---|---|---|---|
| 3,840,115 A * | 10/1974 | Ladewig | 206/506 |
| 4,613,017 A * | 9/1986 | Bok | 188/71.7 |
| 4,742,895 A * | 5/1988 | Bok | 188/71.7 |
| 4,878,563 A | 11/1989 | Baden et al. | |
| 4,977,985 A | 12/1990 | Wells et al. | |
| 5,295,560 A | 3/1994 | Moseley | |
| 5,321,876 A | 6/1994 | Massing et al. | |
| 5,323,880 A | 6/1994 | Wells et al. | |
| 5,509,507 A | 4/1996 | Wells et al. | |
| 5,551,534 A | 9/1996 | Smithberger et al. | |
| 5,926,932 A | 7/1999 | Niespodziany et al. | |
| 5,992,577 A * | 11/1999 | Souetre | 188/71.5 |
| 6,205,633 B1 | 3/2001 | Niespodziany et al. | |
| 6,286,634 B1 | 9/2001 | Niespodziany et al. | |
| 6,327,765 B1 | 12/2001 | Niespodziany et al. | |
| 6,340,075 B1 * | 1/2002 | Bok et al. | 188/71.7 |

FOREIGN PATENT DOCUMENTS

| | | |
|---|---|---|
| EP | 0346066 A1 | 12/1989 |
| EP | 0 716 244 A2 | 6/1996 |
| EP | 1103738 A1 | 5/2001 |

OTHER PUBLICATIONS

Stimson, I.L., "First lightweight disc brakes for a civil airliner"; 75i Aircraft Engineering, Jun. 1971, vol. 43, NR6; pp. 12-13.

* cited by examiner

*Primary Examiner*—Robert A. Siconolfi
(74) *Attorney, Agent, or Firm*—Birch, Stewart, Kolasch & Birch, LLP

(57) ABSTRACT

A method of increasing carbon disc utilization in aircraft carbon brakes. A brake (10) is initially assembled with a heat stack (16) of alternating thick rotors (R1–R4) and thin stators (S1–S3). When the piston (20) is fully extended, it is retracted and a spacer (30) is inserted between the piston (20) and the original heat stack (16). The brake (10) is then subjected to a another half tour. After this half tour, the brake (10) is overhauled, and the now-thin discs (S1–S3, PP and BP) are replaced with thick discs to form another heat stack (50). For the next half tour, no spacer is used between the piston (20) and the heat stack (50). At the end of this half tour and the piston (20) is fully extended, a spacer (70) is inserted between the piston (20) and the heat stack (50). The heat stack (50) remains unchanged. For the next half tour, it is accomplished with the spacer (70). When this half tour is completed, the worn out rotors are replaced with new thick rotors and the process can be repeated.

23 Claims, 3 Drawing Sheets

METHOD OF INCREASING FRICTION MATERIAL UTILIZATION FOR CARBON BRAKES

TECHNICAL FIELD AND INDUSTRIAL APPLICABILITY OF THE INVENTION

The present invention generally relates to carbon disc brakes, and more particularly to multi-disc carbon brake systems used in aircraft's landing systems.

BACKGROUND OF THE INVENTION

Aircraft brakes typically include a plurality of stator discs and rotor discs which are compressed together during the braking operation of an aircraft. The stator discs and rotor discs are normally arranged in alternating fashion in order to form a brake disc stack.

The stationary, stator discs of the disc stack are arranged in a non-rotating position surrounding an aircraft brake structure or shaft. The rotating, rotor discs are secured to a periphery of the aircraft wheel or shaft and are normally free to rotate with the aircraft wheel when the brake is not in use.

A brake housing may include a plurality of pressure piston actuators that are arranged to provide the compressive, braking force that forces the stator discs and rotor discs of the aircraft brake's disc stack together. Brake adjusters may be employed within the brake to provide adjustment of the relative positions of the brake discs as these frictional components become worn during brake usage. Worn discs need to be replaced in order to maintain a certain level of heat stack mass, as well as ensure the piston stroke. Discarding still usable discs does not make good economic sense for aircraft owners.

In some conventional brake units, a "Balanced" design was adopted to keep the rotor weight approximately the same as the stator weight, so that neither component would get substantially hotter than the other component in the brake unit. However, upon completion of the tours, such "Balanced" design ended up producing many worn one-piece discs, which had to have a significant amount of material ground off if they were to be 2-for-1 refurbished with other one-piece discs. Grinding off usable carbon also does not make good economic sense for aircraft owners.

Due to the cost associated with carbon usage and resources needed to replace and/or refurbish the worn carbon discs, it would be desirable to have a disc brake unit that optimizes the degree of wear on each individual disc. In other words, it would be desirable to have a disc brake unit that makes the most utilization out of each disc before it is discarded or refurbished.

Therefore, there is a need for increasing carbon disc utilization in aircraft brakes to reduce overall operating costs for aircraft owners.

SUMMARY OF THE INVENTION

A method of increasing carbon disc utilization in aircraft brakes is disclosed. The method of the present invention comprises initially assembling a brake with a combination of alternating thick and thin discs. The first half tour is completed without the use of a heat sink or piston spacer. When the piston stroke is exhausted at the end of the first half tour, it is retracted and a piston or heat sink spacer is inserted between the piston and the original heat sink components and, if appropriate, adjuster tubes are replaced.

The brake is then subjected to a second half tour. After the second half tour, the brake unit is overhauled, and the thin discs are replaced with thick discs. The previously thick components are machined to reestablish flat friction surface and they become the thin components for the subsequent half tours.

For the next half tour, the heat sink has the same approximate thickness as the previous half tour and no spacer is used between the piston and the heat sink. At the end of this half tour and the piston is fully extended, a spacer is inserted between the piston and the heat sink and the piston is retracted. Adjuster tubes may also be replaced.

For the next half tour, it is accomplished without heat sink machining. If appropriate, the used thin discs that have been removed from the brake at the end of the half tours with spacers may be refurbished using a two-for-one process and may re-enter the brake assembly either as thick or thin two-piece components.

In one embodiment of the present invention, the spacer is a stationary heat sink element which is placed between the piston and the active heat sink. In another embodiment of the present invention, the spacer is a non-heat sink element which is attached to the piston. The spacer may be made of carbon, or non-carbon, such as steel, material.

DETAILED DESCRIPTION OF THE PREFERRED EMBODIMENT

Figure 1:
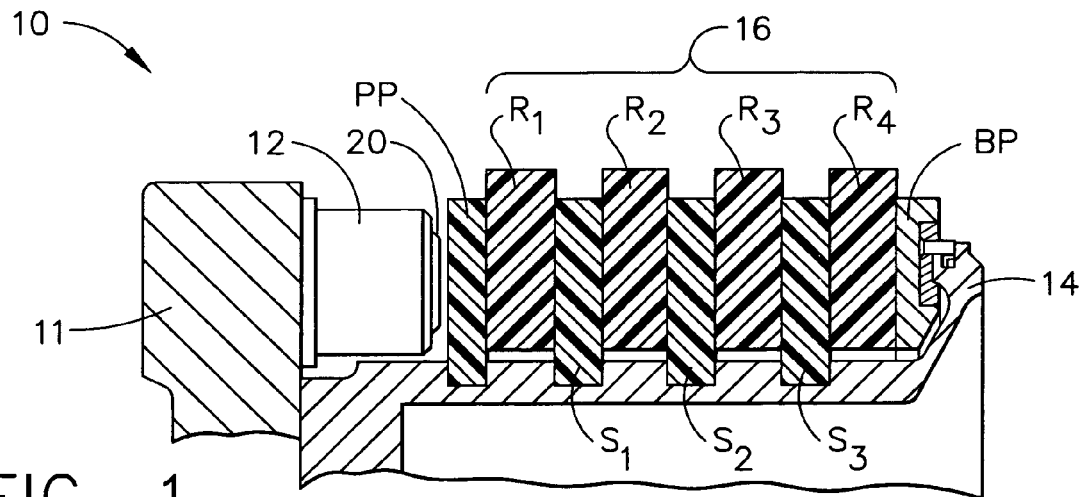
FIG. 1 is an illustration of an aircraft brake assembly in a first configuration with thick rotors and thin stators.

Reference is first to FIG. 1, where a first configuration of a rotor/stator assembly of an aircraft carbon brake unit 10 is illustrated. The brake unit 10 includes a torque tube 14 attached to a piston housing 11 by a plurality of bolts (not shown). The piston housing 11 includes a piston bushing assembly 12 with a piston 20. The heat stack designated generally by reference numeral 16 includes carbon rotor discs, R1–R4, that engages, via spline and slot arrangements, the surrounding wheel (not shown), as is well known in the art, and alternating carbon stator discs, S1–S3, engaging the torque tube 14 via the well known spline and slot arrangments. At one end of the heat stack 16 is a pressure plate, PP, between the piston 20 and the rotor R1. At the other end of the heat stack 16 is a back plate, BP, which engages the torque tube 14 via a steal structure, as is also well known in the art of carbon disc brakes. The actual number of stages or disc pairs will vary from brake to brake as required by the particular airplane design requirements.

It should be pointed out that the brake unit 10 illustrated in FIG. 1 has the same general structure as those units illustrated in FIGS. 2–8, with the exception that the heat stack 16 will vary from configuration to configuration in accordance with the present invention.

Referring to the first configuration illustrated in FIG. 1, the heat stack 16 is arranged, from the PP toward the BP, with thick rotors R1–R4, alternating with thin stators S1–S3. This first configuration marks the beginning of the first "half tour" with a Thick Rotor/Thin Stator arrangement. It should be pointed out that each "half tour," in accordance with the present invention, begins with the piston 20 retracted and ends when the piston stroke of the piston 20 is nearly fully exhausted, i.e. cannot push any further. To be able to get more usable heat stack weight, i.e. the carbon material, into the heat stack 16, a shorter piston stroke may be implemented in accordance with the present invention. As such, a "half tour" is reached when the piston stroke is nearly fully exhausted, even though the heat stack still has adequate useable carbon left.

Figure 2:
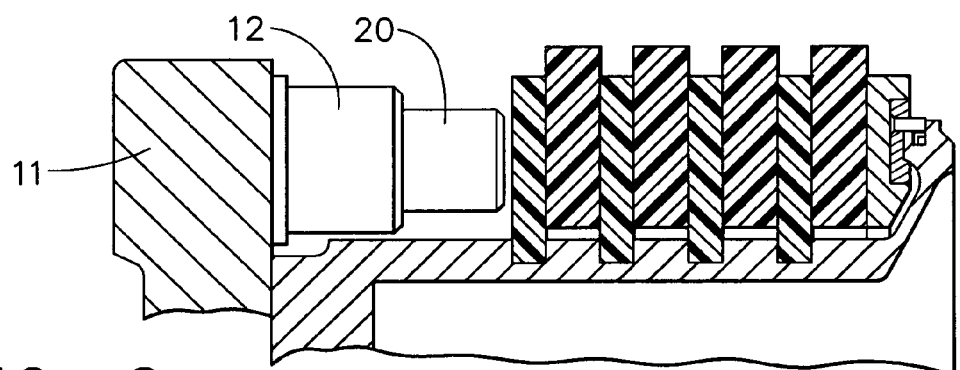
FIG. 2 is an illustration of an aircraft brake assembly in the first configuration with the piston stroke fully exhausted.

FIG. 2 illustrates the first configuration of the brake unit 10 at the end of the first half tour. Due to the many aircraft landings, the rotors R1–R4, stators S1–S3, PP and BP have been worn out to a certain level, which causes the piston stroke of the piston 20 to be nearly fully exhausted.

Figure 3:
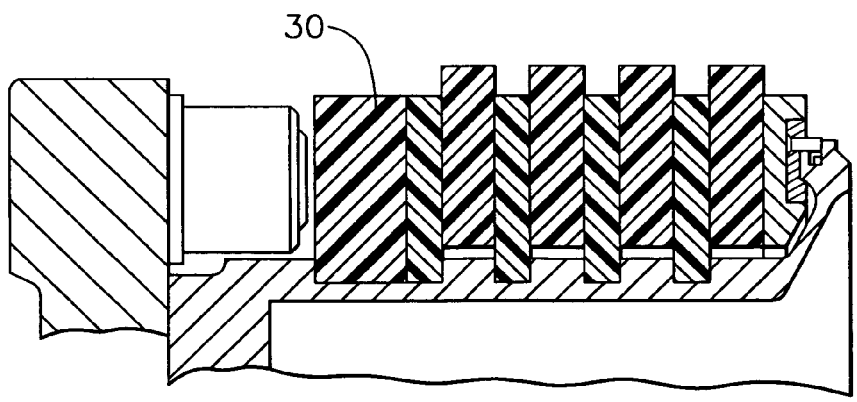
FIG. 3 is an illustration of an aircraft brake assembly in a second configuration with a spacer inserted.

At this point, a conventional approach would have been either complete or partial heat stack replacement to reestablish the requisite heat sink weight, even though the heat sink weight is only down to an intermediate level. However, in accordance with the present invention, a spacer 30 is inserted and the piston 20 is pushed back, as illustrated in FIG. 3, to form a second configuration for the heat stack 16. This second configuration marks the beginning of a second half tour, since the original heat stack 16 of the Thick Rotor/Thin Stator arrangement can continue to be used without having to be overhauled at this time. If appropriate due to disc wear, adjuster tubes are replaced at this time. As can be appreciated by those skilled in the art, adjuster tubes are used in conjunction with an expander and pin to provide the "adjustment" when a brake wears. The tubes remain relatively stationary only moving with the spring upon initial actuation of the brake. Upon wear of the brake, the pin which is attached to the stack pulls the expander through the tube. The tube is a replaceable part.

Figure 4:
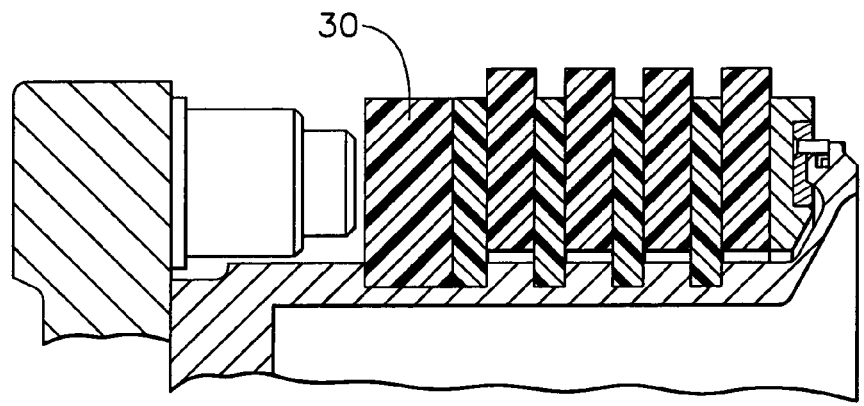
FIG. 4 is an illustration of an aircraft brake assembly in the second configuration with the piston stroke fully exhausted.

At the end of the second half tour with the second configuration, as shown in FIG. 4, the stators S1–S3, PP and BP are completely worn out, which causes the piston stroke of the piston 20 to be nearly fully exhausted again. At this point, in accordance with the present invention, the heat stack 16 is overhauled and a third configuration for the heat stack 50 is introduced, as will be shown in FIG. 5.

It should be pointed out that in one embodiment of the present invention, the spacer 30 is constructed using carbon material, such that it can contribute to the heat stack mass. Another embodiment of the present invention uses non-carbon material, such as steel, for the spacer 30. In this latter embodiment, the spacer may be attached either to the piston or to the pressure plate.

If the spacer 30 is made of carbon, it may be implemented by reconstituting several pieces of previously-worn carbon discs together, such as the worn-out carbon stators from a previous tour. Alternatively, the spacer 30 may be just a single piece of carbon. Also, the spacer 30 may be designed to slide along the spline, much in the same way as the PP. Alternatively, the spacer 30 may be constructed as an extension attached to the piston 20. Essentially, the spacer 30 acts as a load transfer member to transfer the force of the piston 20 to the PP, rotors and stators of the heat stack. Although the spacer is not needed as an active rubbing surface, its material composition, such as carbon, can contribute to lowering the temperature of the heat stack, if properly selected based on the overall brake design.

Figure 5:
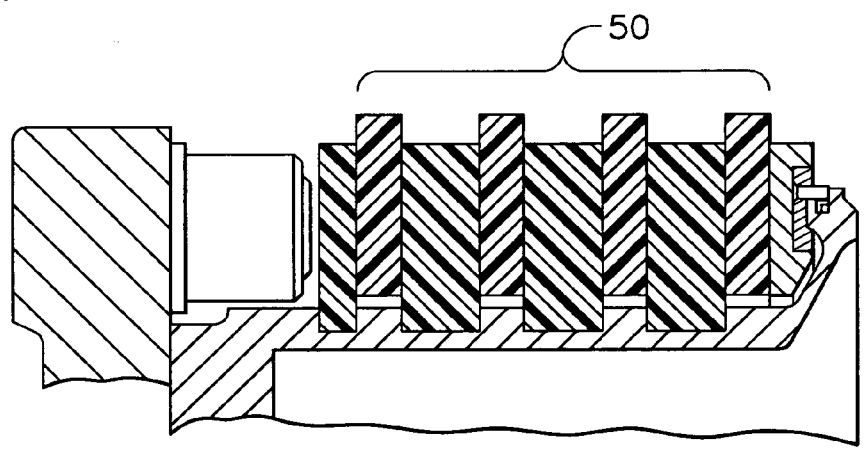
FIG. 5 is an illustration of an aircraft brake assembly in a third configuration with thick stators and thin rotors.

Reference is now to FIG. 5, where a third configuration of the heat stack 50 of the aircraft carbon brake unit 10 is illustrated. Here, thick stators S1–S3, new PP and new BP are introduced to replace the stators S1–S3, PP and BP of the original heat stack 16 after the end of the second half tour of the Thick Rotor/Thin Stator arrangement. This third configuration uses thin rotors R1–R4, such as the ones remaining from the original heat stack 16 in the previous configuration, to form a heat stack 50 to commence a first half tour with the now Thick Stator/Thin Rotor arrangement.

Figure 6:
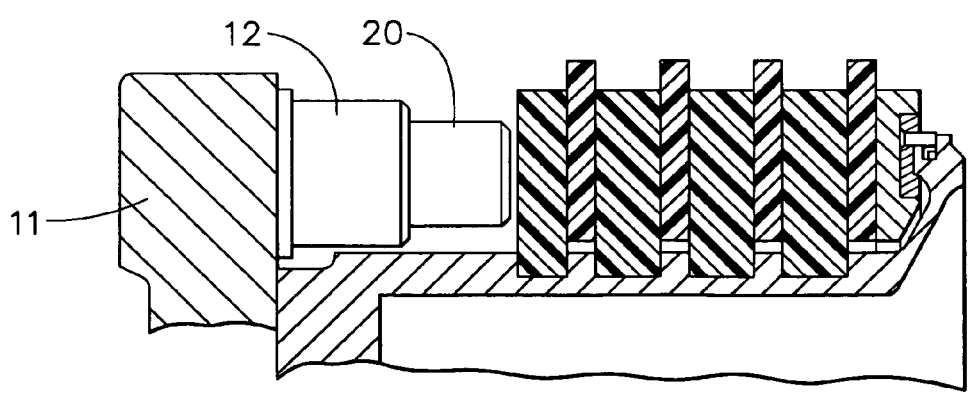
FIG. 6 is an illustration of an aircraft brake assembly in the third configuration with the piston stroke fully exhausted.
Figure 7:
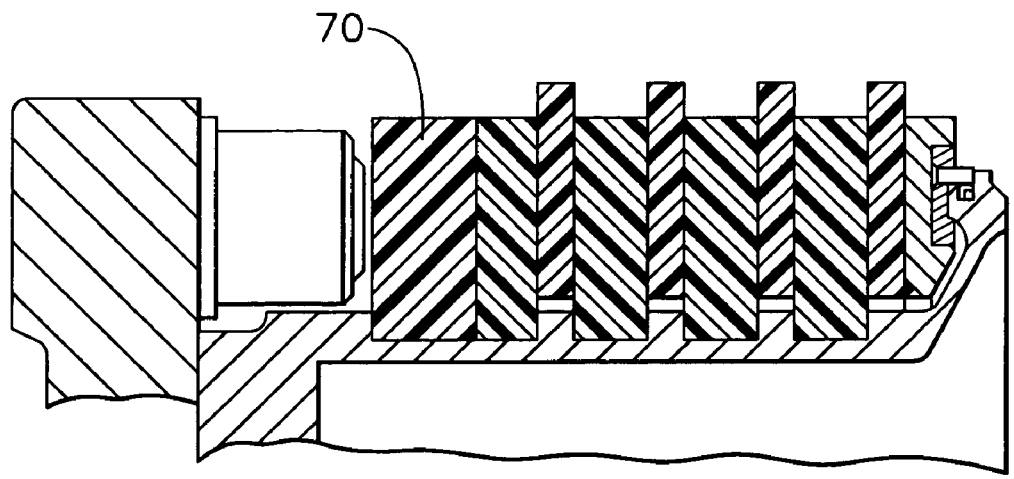
FIG. 7 is an illustration of an aircraft brake assembly in a fourth configuration with a spacer inserted.

The first half tour with the Thick Stator/Thin Rotor arrangement ends when the heat stack 50 is worn to the level that causes the piston stroke of the piston 20 to be nearly fully extended, as illustrated in FIG. 6. Because of the shorter piston stroke as previously mentioned, the heat stack still has some usable carbon left. At this point, a fourth configuration is formed by inserting a spacer 70 and retracting the piston 20, while the components of the heat stack 50 remain unchanged. This fourth configuration, illustrated in FIG. 7, marks the beginning of a second half tour with the Thick Stator/Thin Rotor arrangement.

Figure 8:
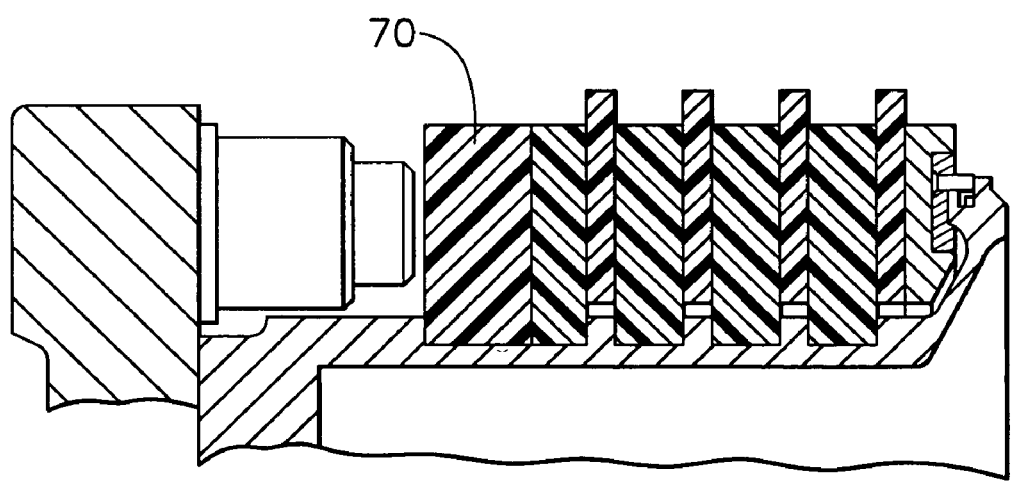
FIG. 8 is an illustration of an aircraft brake assembly in the fourth configuration with the piston stroke fully exhausted.

Finally, the fourth configuration reaches the end of the second half tour, when the piston stroke of the piston 20 is, again, nearly fully exhausted, as shown in FIG. 8. At this point, the rotors R1–R4 are completely worn out. The stators S1–S3, PP and BP are also worn out to some level, although they are not as much as the rotors. In accordance with the present invention, the stators, PP and BP can continue to be used in a half tour with the Thick Rotor/Thin Stator arrangement as illustrated in FIG. 1, with new thick rotors being assembled to form the heat stack 16.

In one embodiment of the present invention, the worn-out rotors from the end of the fourth configuration may be discarded, if they cannot be refurbished into useful new rotors. In another embodiment of the present invention, the worn-out rotors are reconstituted in a two-for-one refurbishment process to form new thick rotors for use with the Thick Rotor/Thin Stator tour. In another embodiment of the present invention, the worn out rotors are reconstituted in a two-for-one refurbishment process to form new thin rotors for use with the Thin Rotor/Thick Stator tour.

The method and arrangement described above and illustrated in the drawings provide a fuller utilization of the friction material for carbon brakes by combining Multi-Tour®, thick-thin methodology with the use of spacers. Additionally, more useable carbon material can now be assembled and used in the heat stack, by virtue of adopting a shorter piston stroke with the multi-tour, thick-thin and spacer approach of the present invention.

We claim:

1. A method of arranging carbon brake disks for an aircraft brake unit, said brake unit comprising:
   a first group of stators coupled to a torque tube alternating with a first group of rotors coupled to a corresponding wheel;
   a first pressure plate ("PP") at one end of said torque tube, being adjacent to a braking piston, said braking piston capable of traveling a predetermined wear stroke;
   a first back plate ("BP") at the other end of said torque tube, the method comprising the steps of:

a) placing the first group of rotors and the first group of stators between the first PP and the first BP, each rotor of said first group of rotors having a thickness greater than a thickness of each stator of said first group of stators;

b) when said braking piston travels said predetermined wear stroke, retracting said braking piston and inserting a first spacer between said first PP and said braking piston;

c) when said braking piston travels said predetermined wear stroke, and each of said first group of stators has an ending thickness, removing said first spacer, replacing said first PP and BP with a second PP and BP, and replacing said first group of stators with a second group of stators, each stator of said second group of stators having a thickness that is greater than said stator ending thickness;

d) when said braking piston travels said predetermined wear stroke, retracting said braking piston and inserting a second spacer between said second PP and said braking piston;

e) when said braking piston travels said predetermined wear stroke, and each rotor of said first group of rotors has an ending thickness, replacing said first group of rotors with a second group of rotors, each rotor of said second group of rotors having a greater thickness than said rotor ending thickness.

2. The method of claim 1, further comprising:

f) refurbishing said first group of rotors removed from said step e) to form rotors having the same thickness as said rotors from said step a);

g) repeating said step a) using said refurbished rotors from said step f).

3. The method of claim 1, wherein said first spacer is made of at least one carbon piece.

4. The method of claim 1, wherein said first spacer is made of at least one non-carbon piece.

5. The method of claim 3, wherein said first spacer is arranged as one of an extension of said braking piston and an attachment to said pressure plate.

6. The method of claim 3, wherein said first spacer is arranged to be slideably coupled to said spline of said torque tube.

7. The method of claim 1, wherein said second spacer is made of at least one carbon piece.

8. The method of claim 1, wherein said second spacer is made of at least one non-carbon piece.

9. The method of claim 3, wherein said second spacer is arranged as one of an extension of said braking piston and an attachment to said pressure plate.

10. The method of claim 3, wherein said second spacer is arranged to be slideably coupled to said spline of said torque tube.

11. A method of assembling carbon brake disks for an aircraft brake unit, said brake unit having a braking piston capable of traveling a predetermined wear stroke and engaging a group of rotors and stators to provide braking function to the aircraft, said stators being coupled to a torque tube coupled to said piston, comprising the steps of:

a) arranging a first group of stators alternating with a first group of rotors between a first pressure plate and a first back plate, said rotors having a thickness greater than said stators;

b) upon reaching a predetermined wear stroke, inserting a first spacer to reset said wear stroke;

c) upon reaching said wear stroke, replacing said first group of stators with a second group of stators having a thickness greater than said first group of stators, replacing said first pressure plate and said first back plate with a second pressure plate and a second back plate;

d) upon reaching said wear stroke, inserting a second spacer to reset said wear stroke;

e) upon reaching said wear stroke, replacing said first group of rotors with a second group of rotors, said second group of rotors having the same thickness as the first group of rotors in step a).

12. The method of claim 11, said method further continuing from step e) to step a).

13. The method of claim 11, wherein said second group of rotors are formed by refurbishing rotors already worn out.

14. The method of claim 11, wherein said first spacer is made of at least one carbon piece.

15. The method of claim 11, wherein said first spacer is made of at least one non-carbon piece.

16. The method of claim 14, wherein said first spacer is arranged as one of an extension of said braking piston and an attachment to said first pressure plate.

17. The method of claim 14, wherein said first spacer is arranged to be slideably coupled to said spline of said torque tube.

18. The method of claim 11, wherein said second spacer is made of at least one carbon piece.

19. The method of claim 11, wherein said second spacer is made of at least one non-carbon piece.

20. The method of claim 14, wherein said second spacer is arranged as one of an extension of said braking piston and an attachment to said first pressure plate.

21. The method of claim 14, wherein said second spacer is arranged to be slideably coupled to said spline of said torque tube.

22. A method of assembling and overhauling a disk brake comprising the steps of:

providing a plurality of first stator elements having a first thickness;

providing a plurality of first rotor elements having a second thickness equal to a rotor element starting thickness, the second thickness being greater than the first thickness;

assembling a brake assembly having a thickness and comprising a disk stack comprising a plurality of alternating first rotor elements and first stator elements and a piston operable to selectively compress the disk stack to slow a wheel to which the rotors are attached;

operating the brake assembly until the thickness of the brake disk stack equals a brake disk stack intermediate thickness;

moving the piston away from the brake disk stack;

inserting a spacer between the piston and the brake disk stack;

operating the brake assembly until the thickness of the first stator elements equals a stator element ending thickness equal to one half the stator element starting thickness;

removing the first stator elements having the stator element ending thickness;

removing the spacer;

joining pairs of first stator elements each having the stator element ending thickness to form replacement stator elements having a stator element starting thickness; and replacing the first stator elements with replacement stator elements.

23. The method of claim 22 including the additional steps of:

operating the brake assembly until the thickness of the brake disk stack equals the brake disk stack intermediate thickness;

moving the piston away from the brake disk stack;

inserting the spacer between the piston and the brake disk stack;

operating the brake assembly until the thickness of the rotor elements equals a rotor element ending thickness;

removing the spacer;

joining pairs of first rotor elements each having the rotor element ending thickness to form a replacement rotor element having a rotor element starting thickness; and replacing the first rotor elements with replacement rotor elements.

* * * * *